United States Patent [19]

Mumford et al.

[11] 4,298,373
[45] Nov. 3, 1981

[54] APPARATUS FOR CUSHIONING THE MOTION OF RECIPROCATING MEMBERS

[75] Inventors: Eustace H. Mumford, Ottawa Lake, Mich.; Jack I. Perry, Sylvania, Ohio

[73] Assignee: Owens-Illinois, Inc., Toledo, Ohio

[21] Appl. No.: 112,012

[22] Filed: Jan. 14, 1980

[51] Int. Cl.³ .......................... C03B 9/04; F01B 9/00
[52] U.S. Cl. ....................................... 65/260; 92/68; 92/85 A; 92/136
[58] Field of Search ............... 92/68, 85 A, 85 B, 136; 65/219, 260

[56] References Cited

U.S. PATENT DOCUMENTS

| | | | |
|---|---|---|---|
| 1,911,119 | 5/1933 | Ingle | 65/219 |
| 2,408,338 | 9/1946 | Parsons | 92/85 A |
| 2,508,890 | 5/1950 | Rowe | 92/85 A |
| 3,148,595 | 9/1964 | Looney | 92/68 |
| 3,446,317 | 5/1969 | Gryglas | 188/88 |
| 3,447,423 | 6/1969 | Henry | 92/68 |
| 3,831,500 | 8/1974 | Kitamura | 92/68 |
| 4,043,254 | 8/1977 | Jaeger | 92/85 B |

*Primary Examiner*—Abraham Hershkovitz

*Attorney, Agent, or Firm*—M. E. Click; D. H. Wilson; D. T. Innis

[57] ABSTRACT

The take-out mechanism on a glass container forming machine is operated by the vertical reciprocation of a fluid motor. The movement of the tongs into position to grasp a new container is controlled so that the tong arm which is swinging through an arc of 180° degrees, is cushioned in its final movement so as to avoid excessive vibration of the mechanism.

The pressure introduced into the motor for moving the tong arm into position over the dead plate is also connected to a second piston which is spring-biased in relation to the piston rod of the motor. When the tong arm has completed its movement and released the container at the dead plate, the pressure is discontinued at both the motor and the second piston which results in the rod of the second piston actuating the motor rod to cause the tongs to be lifted a predetermined amount. Two racks are driven by the motor through a common pinion and the racks are decelerated at the ends of their travel which corresponds to movement of the tong arms into their two final positions.

13 Claims, 3 Drawing Figures

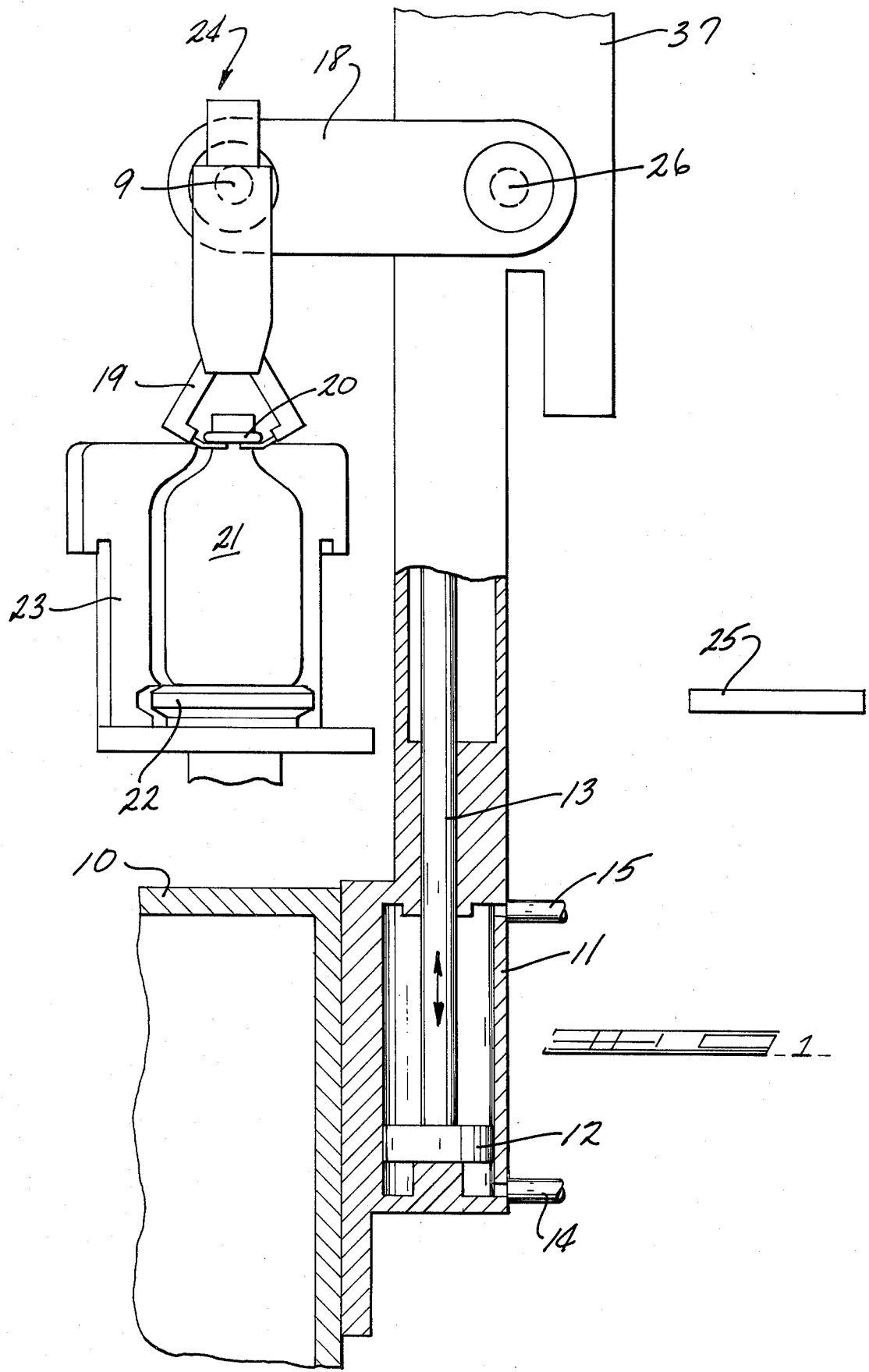

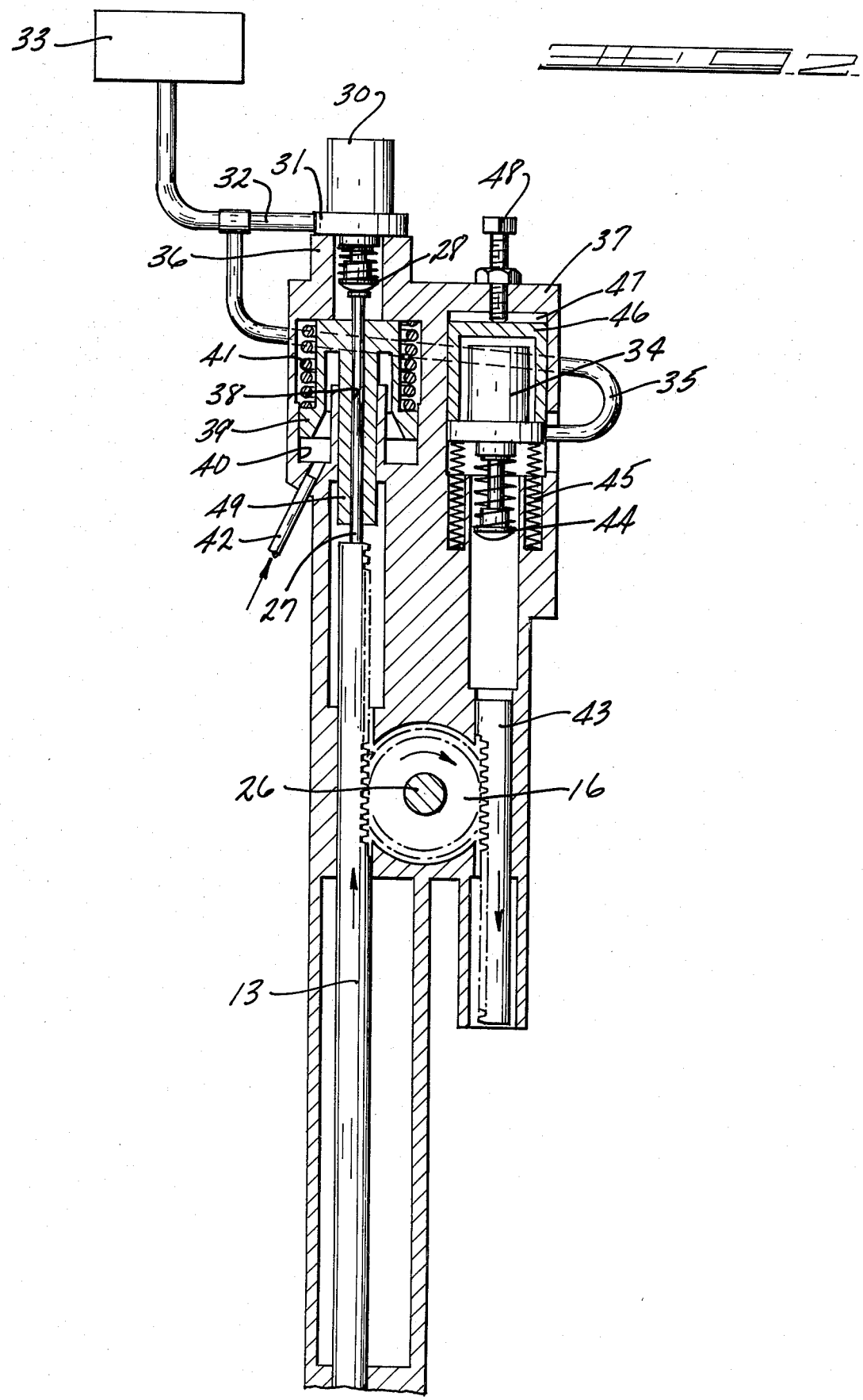

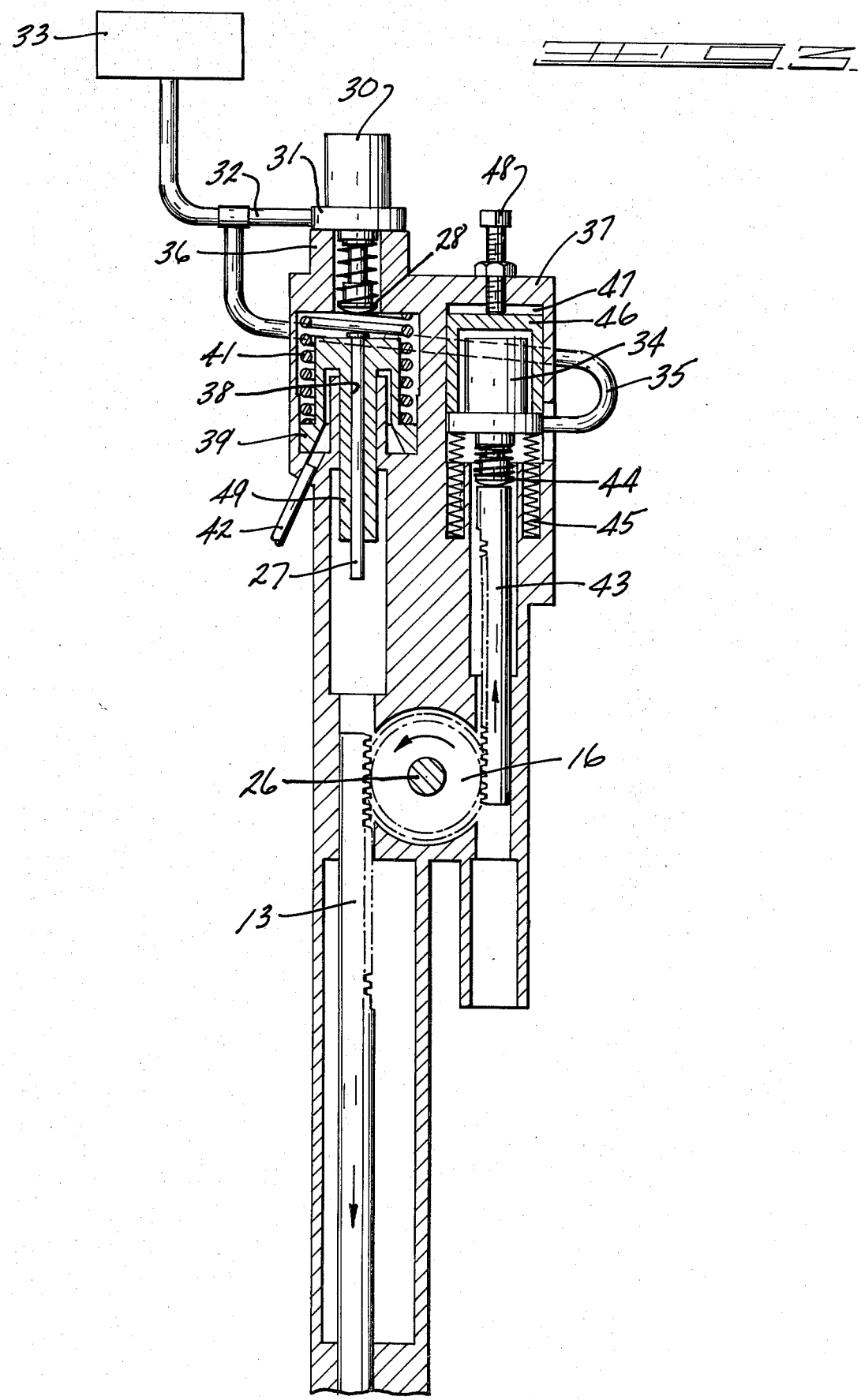

APPARATUS FOR CUSHIONING THE MOTION OF RECIPROCATING MEMBERS

BACKGROUND OF THE INVENTION

This invention relates to apparatus for cushioning the motion of a reciprocating member on a glass forming machine. A typical glass forming machine, such as a Hartford I.S. type machine, has several reciprocating members which are pneumatically operated by reciprocating motors. An example of a Hartford I.S. machine and the mechanisms which are contained thereon, may be found in U.S. Pat. No. 1,911,119. In the operation of such a machine and as clearly shown in FIG. 4 of this patent, a blowhead 257 is raised and lowered by the operation of a motor 266. A "take-out" mechanism 280 also is operated by a separate pneumatic motor. An invert arm 171 is driven by the operation of a pneumatic motor 200. On the parison forming side a funnel arm 57 also is operated by a motor 67 and a baffle 85 also is reciprocated by a motor 101. In all of these mechanisms there is a need for the mechanisms to be cushioned at both ends of the travel of the reciprocating member. After the ware has been formed in such a machine, the ware is moved from the blow mold to an adjacent dead plate where the ware is cooled. The movement of the ware from the blow mold to the dead plate is effected by a take-out mechanism, generally designated C in the Ingle patent.

Attempts have been made in the past to cushion the movement of the reciprocating members, such as the neck ring invert mechanism or the take-out mechanism. The cushioning device are known per se and one such device is the type disclosed in U.S. Pat. No. 3,446,317. Such cushioning devices such as that of the patent and others, are sold by Efdyn Corporation of Chicago, Ill.

In the glass forming art generally, the cushioning devices on automatic forming machines are pneumatic in nature and, as such, are less than positive in their stopping characteristics. As one might expect, pneumatic cushioning is effected to a great extent by the degree of compression of the gas and temperature. Those types where a gas will escape through needle valves, adjustment of these valves and the degree of compression and rate of leakage of the gas were difficult to control and maintain consistent in their operation.

The present invention overcomes many of the problems inherent in the use of pneumatic cushioning systems and permits utilization of hydraulic cushioning means which is readily accessible for adjustment, thus providing control for the reciprocating members which will respond more positively to the final end position of the driving member being controlled, in both directions.

In U.S. Pat. No. 4,043,254, there is described a cushioning system for hydraulically cushioning the movement of the invert drive motor of a glass forming machine of the I.S. type. While this reference teaches the broad concept of cushioning a reciprocating member that is pneumatically driven by the use of hydraulic means, the apparatus that performs the cushioning function is incorporated in the drive motor for the reciprocating member and the piston of the motor is the actual part of the motor that is physically operated on. As the piston 10 of the invert drive reaches the extremes of its movement, it contacts the actuator of the cushion device. Adjustment of the stroke length of the motor, or rather the point in the movement of the piston when it will contact the cushion actuator, is by a threaded element which, in one case is in the piston, and in another case on the end of the actuator to change its length. The present invention is believed to be an improvement over the mechanism disclosed in the Jaeger patent and, in its actual embodiment shown, is in conjunction with the "take-out" mechanism of the well-known "I.S." glass forming machine.

SUMMARY OF THE INVENTION

It is an object of the present invention to provide an improved cushioning mechanism for a reciprocating member in a glassware forming machine.

It is another object of this invention to provide a hydraulic cushioning mechanism for cushioning a reciprocating member at both ends of its travel.

In accordance with the present invention, a glassware forming machine is provided with hydraulic cushioning for the motion of a reciprocating member in both directions in which a first rack gear is carried by one end of said member, in engagement with a pinion which is supported for rotation about a horizontal axis. A second rack engages the pinion at a diametrically opposed area thereof. Both the first rack and the second rack are provided with decelerators or shock absorbers positioned in axial alignment therewith. Movement of the first rack will be cushioned by engagement with the decelerator which is in alignment therewith and movement of a second rack in opposing relationship to the first rack will engage a second decelerator which is positioned in alignment therewith, with the second decelerator being adjustable relative to the path of travel of the second rack to thereby adjust the movement of the member being cushioned.

BRIEF DESCRIPTION OF THE DRAWINGS

FIG. 1 is a side elevational view, partly in section, of the take-out mechanism of a glass forming machine;

FIG. 2 is a cross-sectional view through the upper portion of the mechanism of FIG. 1, showing the reciprocating drive member in its most elevated position in contact with the first shock absorber;

FIG. 3 is a view similar to FIG. 2, showing the reciprocating member in its lowermost postion with the second shock absorber.

DETAILED DESCRIPTION OF THE DRAWINGS

With specific reference to FIG. 1, there is schematically illustrated a lower support 10 of a glassware forming machine to which is attached a pneumatic motor 11. The motor 11 carries a piston 12 therein which drives a rod 13 with a reciprocating up and down motion in response to introduction of fluid under pressure to the lines 14 and 15 connected thereto. Specifically, vertical reciprocation of the rod 13 will cause rotation of a pinion 16. The pinion 16 is drivingly connected to a take-out head 17 carried at the outwardly extending end of a take-out arm 18. The take-out head 17 carries a pair of tongs 19 which are adapted to grip beneath the finish portion 20 of a glass container 21.

As shown in FIG. 1, the container 21 is positioned on a bottom plate 22 of a two-piece glass forming mold 23, of which only one-half is shown. The take-out mechanism, generally designated 24, when operated will lift the bottle 21 from the dead plate 22 and place the container onto the dead plate schematically illustrated 25.

As can readily be seen, rotation of the pinion 16 in the clockwise direction, as illustrated by the arrow thereon in FIG. 2, will cause the take-out mechanism 24 to also be moved in a clockwise direction about the center of shaft 26 of the pinion 16. The arm 18 will move upward about the center of shaft 26. The mechanism within the arm 18 may take the form of a chain drive extending about a pair of spaced sprockets, one of which is mounted to the shaft 26 and to be rotated thereby, while the other sprocket will be mounted to rotate about the center 9 of the support for the take-out head 17. Thus the take-outhead retains its vertically aligned position during movment in carrying the bottle 21 from the mold 23, as seen in FIG. 1, through a 90° arc to the schematically illustrated dead plate 25. As the rod 13 moves upwardly to effect the transfer of the container 21 from the mold to the dead plate, it will encounter a rod 27. The upper end of the rod 27 will engage a plunger 28 of a hydraulic cushion or decelerator 29. It should be understood that the decelerator or shock absorber 29 takes the form of a cylinder 30 which is closed at its upper end and sealed at its lower end to a base 31 that has an opening into the side thereof which communicates with the interior of the cylinder 30. Within the cylinder and connected to the plunger 28, is a piston that has its movement controlled in the manner taught in the patent cited above. A specific example of a decelerator or shock absorber is an EFDYN (Model ES) made by EFDYN Corporation, 3700 S. Dobson Ave., Chicago, Ill.

Generally speaking, the decelerator 29 is a liquid filled device in which movement of a piston is controlled by movement of the hydraulic fluid therein through accurately positioned ports in the wall of the cylinder. The liquid is in communication through a pipe 32 with a reservoir 33 containing a supply of hydraulic fluid. A second shock absorber or decelerator 34 is of identical configuration as that of 29 and has a pipe 35 connected to the pipe 32, thus both decelerators 29 and 34 are connected to the make-up liquid reservoir 33. The reservoir is elevated above the level of the shock absorbers and a single reservoir could serve pairs of absorbers on, for example, 10 sections of a complete 10-section I.S. glass forming machine, gravity serving to keep the decelerators filled. The base 31 of the decelerator 29 is fixed to an upper end 36 of a schematically illustrated guide and supporting structure 37. The guide structure 37 serves as a support for the pinion 16 and the take-out mechanism 24. The rod 27 passes downwardly through a coaxial bore 38 of a piston member 39. The piston 39 rides within a cylindrical cavity 40 formed in the upper portion of the guide structure 37. The piston 39 is biased in a downward direction by a helical spring 41. The cavity 40 is connected through a pipe 42 to a source of air under pressure (not shown).

With particular reference to FIG. 3, it can be seen that upon movement of the piston rod 13 in a downward direction to effect return movement of the take-out head 17 to the position shown in FIG. 1, the pinion 16 will be rotated in a counterclockwise direction, as shown in FIG. 3, causing a rack 43, which is in engagement with the pinion 16, to move in an upward direction. The upper end of the rack 43 will engage a plunger 44 of the decelerator 34. The decelerator 34 is biased upwardly by a plurality of springs 45. As can be seen, the base of the decelerator 34 will be held against the lower rim of a cylindrical member or housing 46 which is positioned within a cavity 47 provided in the guide structure 37. The position of the decelerator 34 may be adjusted vertically to any desired position within limits by adjustment of a threaded bolt 48. It should be noted that springs 45 will hold the cylindrical member 46 in engagement with the lower end of the threaded bolt 48. When the drive motor 11 is in the position illustrated in FIG. 1, with its piston 12 in the extreme down position of travel, the pinion 16 and racks 13 and 43 will be in the position illustrated in FIG. 3.

The operation of the mechanism as described above, with the piston 12 in its lowermost position, with the tongs closed about the neck of the bottle, the mechanism is positioned where it will begin its operation to take the finished ware from the blow mold. When air is applied to the blind side of the piston 12, it will cause the piston and rod 13 to move upward, in turn rotating the gear which moves the rack 43 downward. As the piston and rod move upward, the end of the rack 13 will come in contact with the rod 27. This rod passes through the bore 38 of rod 49 of the piston 39 and comes in contact with the shock absorber 29. When this shock absorber is fully stroked, it will have decelerated the piston rod to a complete, but controlled stop.

When airunder pressure is applied to the blind side of the piston 12, it is also applied through the pipe 42 to the piston 39 on the rod side. This causes the piston 39 and its rod 49 to move upward compressing the spring 41. The up position of this piston 39 will be such that the top end of the rack 13 will not come in contact with the bottom end of the piston rod 49 during or at the end of the up motion of the rack 13. At this time, the tong arm 18 will be in a horizontal position with the tong head over the center line of the dead plate 25.

When air pressure is released from both the piston 12 and the piston 39, the spring 41 will force the piston 39 and its rod 49 down against the rack 13 causing this rack to move downward a slight amount. The extent of this movement is controlled by the stroke length of piston 39. This downward motion will cause the pinion 16 to rotate slightly. This rotation will lift the tong arm slightly to a rest position where the tong arms 19 will be above the top of the neck of the bottle positioned and released on the dead plate 25. After rest position, air pressure is then applied to the rod side of the piston 12. This causes the piston to move downward, in turn rotating the pinion 16 which causes the rack 43 to move upward. This motion continues until the shock absorber 34 has been fully stroked and the tongs again will be positioned about the neck of another container positioned on the bottom plate of the blow mold, as shown in FIG. 1.

Thus it can be seen that the mechanism of the invention performs the function of cushioning the end movment of the reciprocating drive for the take-out mechanism.

We claim:

1. In a glassware forming machine, apparatus for hydraulically cushioning the motion of a driven reciprocating member at the extremes in both of its directions, comprising:

means for reciprocating said member;

a first rack gear carried by said member at one end thereof;

a pinion;

means supporting said pinion for rotation about its central axis with its teeth in engagement with said first rack;

a second rack in engagement with said pinion at a diametrically opposed portion thereof;

said second rack being moved axially in equal but opposite amounts as said first rack;

a first decelerator mounted in axial alignment with said first rack;

a second decelerator in axial alignment with said second rack;

a rod extending from adjacent the one end of said first rack to a position just short of said first decelerator;

axially movable means supporting and guiding said rod for axial movement in response to engagement by said first rack;

said rod acting against said first decelerator when said one end of the first rack approaches the maximum extent of its travel in one direction; and means mounting said second decelerator in coaxial alignment with said second rack and engageable thereby in response to movement of said reciprocating member in an opposite direction to a specific extent.

2. The apparatus of claim 1 wherein said means mounting said second decelerator is adjustable relative to said second rack.

3. The apparatus of claim 1 wherein said driven reciprocating member is a piston rod extending from a fluid motor and driving said first rack, said pinion being connected to a take-out mechanism for transferring blown containers from a blow mold to a dead plate, and further comprising a fluid pressure source connected to said fluid motor, means engageable with said first rack upon completion of movement thereof in one direction for moving said piston rod in the opposite direction a predetermined small amount.

4. The apparatus of claim 3 wherein said means for engaging said member comprises a spring-biased second piston rod, biased in the direction of the end of said first rack.

5. The apparatus of claim 4, wherein said second piston rod is tubular and serves as the guide and support for said connecting rod.

6. The apparatus of claim 5, further including means connected to said fluid pressure source for biasing second second piston in the direction away from said first rack.

7. Apparatus for decelerating the motion of a take-out mechanism on a glass container forming machine, comprising:

a reciprocating pneumatic motor having a piston rod extending therefrom;

a first rack gear carried by the extending end of said piston rod;

a pinion in engagement with said rack gear;

means supporting said pinion for rotation about a horizontal axis and means connecting said pinion to a take-out arm;

a second rack in engagement with said pinion at a diametrically opposed portion thereof and confined to vertical movement;

said second rack being moved axially in equal but opposite amounts as said first rack;

a first decelerator mounted above, in axial alignment with said first rack;

a rod extending from above the upper end of said first rack to a position just short of said first decelerator;

axially movable means for supporting and guiding said rod for axial movement, said rod engaging said first rack upon vertical movement of said rack a predetermined amount;

said rod acting against said first decelerator when said first rack approaches the maximum extent of its upward movement;

a second decelerator in axial alignment with said second racks; and means mounting said second decelerator in vertical alignment with the path of movement of said second rack, whereby said second decelerator will cushion the movement of said piston rod in a downward direction by engagement thereof by said second rack.

8. The apparatus of claim 7 wherein said means mounting said second decelerator is vertically adjustable relative to said second rack.

9. The apparatus of claim 7 wherein said axially movable means for guiding said connecting rod comprises a tubular piston rod connected to an annular piston.

10. The apparatus of claim 9 further including spring means urging said annular piston and tubular piston rod in the direction of said first rack gear.

11. The apparatus of claim 10 further comprising a source of fluid under pressure connected to the underside of said annular piston for moving said tubular piston rod against said biasing spring at the same time as said pneumatic motor is actuated to raise said first rack.

12. The apparatus of claim 11 wherein said tubular piston rod is of a length that it will contact the upper end of said first rack, when under spring pressure as fluid under pressure is removed from said annular piston and said first rack is in its most elevated position.

13. The apparatus of claim 12 wherein said biasing spring has sufficient force to move said first rack a predetermined distance when said pressure to said pneumatic motor is discontinued.

* * * * *